United States Patent

[11] 3,616,982

| [72] | Inventor | Paul A. Dion |
| | | North Attleboro, Mass. |
| [21] | Appl. No. | 748,885 |
| [22] | Filed | May 22, 1968 |
| [23] | | Division of Ser. No. 518,821, Jan. 5, 1966, Pat. No. 3,408,727 |
| [45] | Patented | Nov. 2, 1971 |
| [73] | Assignee | Texas Instruments Incorporated Dallas, Tex. |

[54] METAL CLADDING
11 Claims, 3 Drawing Figs.

[52] U.S. Cl. ............................................. 228/5, 29/471.1, 29/504, 228/18, 228/44
[51] Int. Cl. ............................................. B23k 1/20
[50] Field of Search ............................... 228/18, 44; 29/474.1, 473.9, 504, 997.5

[56] References Cited
UNITED STATES PATENTS

| 2,234,450 | 3/1941 | Quarnstrom | 29/473.9 X |
| 3,167,857 | 2/1965 | Saito et al. | 29/504 X |
| 3,132,418 | 2/1962 | Fulford | 29/471.1 |

*Primary Examiner*—John F. Campbell
*Assistant Examiner*—R. J. Craig
*Attorneys*—Harold Levine, Edward J. Connors, Jr., James P. McAndrews, John A. Haug and Gerald B. Epstein

ABSTRACT: Apparatus for solid-phase metallurgically bonding metal cladding materials such as copper to a wirelike core of aluminum or the like is shown to include means such as an annular shaving die for cutting metal materials from the entire periphery of the wirelike core to expose a virgin metal surface therearound, means such as a manifold establishing a protective or oxide-reducing atmosphere around the virgin metal core surface for maintaining the virgin metal surface free of bond deterrents, means direction clean metal cladding materials around the virgin metal core surface, and means such as a pair of peripherally grooved rolls squeezing the cladding material against said virgin metal core surface with reduction in the composite thickness of the core and cladding material for bonding the cladding to the core entirely around the periphery of the core.

METAL CLADDING

This is a division of application Ser. No. 518,821 filed Jan. 5, 1966 and now U.S. Pat. No. 3,408,727.

This invention relates to metal cladding, and more particularly to the cladding of lengths of metal which are difficult to bond metallurgically in the solid phase because of oxides difficult to remove.

Among the several objects of the invention may be noted the provision of means for the effective removal of substantially all bond-deterent oxide or other films from the metals to be bonded, including those difficult to remove; the provision of effective means for preventing reformation of oxides before rolling to effect a solid-phase metallurgical bond; the provision of such means which is particularly effective for cladding metal strips on round or like core-forming wire, rod, tubing or the like under the comparatively low reductions imposed by such shapes when pressurized by rolling; and the provision of space-saving apparatus for carrying out the improvements. Other objects and features will be in part apparent and in part pointed out hereinafter.

The invention accordingly comprises the products, constructions and methods hereinafter described, the scope of the invention being indicated in the following claims.

In the accompanying drawings, in which one of various possible embodiments of the invention is illustrated, FIG. 1 is a diagrammatic side elevation of apparatus for carrying out the invention;

Corresponding reference characters indicate corresponding parts throughout the several views of the drawings.

In U.S. Pat. Nos. 2,691,815 and 2,753,623 are disclosed so-called cold and warm processes for solid-phase bonding of metal strips under substantial physical reductions effected by rolling under pressure. The principles set forth in said patents have also been employed in cladding strip material on cylindrical core material in the form of wires, rods and tubes. In this connection see, for example, U.S. Pat. application Ser. No. 63,678, filed Oct. 19, 1960 by Kenneth B. Clark for Forming and solid-phase Bonding, and also the U.S. Pat. application of said Kenneth B. Clark, Ser. No. 93,513, filed Mar. 6, 1961 for Manufacture of Clad Rods, Tubing and Clad Tubing. The methods set forth in said patents and applications are generally effective but in cases of certain core materials some difficulties have been encountered which have been costly to avoid. By means of the present invention such difficulties are avoided at low cost.

When it is desired to clad a copper strip or strips on a cylindrical aluminum core by solid-phase roll bonding, it is not feasible, as in the case of bonding strip to strip, to employ a sufficiently high reduction to break up the stable oxide film that ordinarily forms on aluminum so as to obtain bonding contact between virgin copper and virgin aluminum. Therefore it is desirable to remove the aluminum oxide before bonding. Aluminum oxide is not readily chemically reducible to aluminum in a reducing atmosphere. Thus this method of removal is practically foreclosed. If, as may be, the oxide is removed mechanically as by abraiding, skiving, shaving or the like, it reforms rapidly. For example, if after such treatment application of pressure for reduction is delayed for even as short a time as a second, the oxide reforms in amounts substantial enough to become a substantial, if not a complete, bond deterrent. Thus it has been found necessary to reduce this time to a half of a second or less, and this has made difficult the construction of adequate bonding apparatus.

In the following description the bonding of copper strip to cladding aluminum core is used as an example involving the above-mentioned difficulties, but it is to be understood that the invention is applicable to other metals that present the same problems. The term metals as used herein comprehends alloys. The term protective atmosphere comprehends both oxide-reducing and inert atmospheres such as hydrogen and helium.

Figure 2:
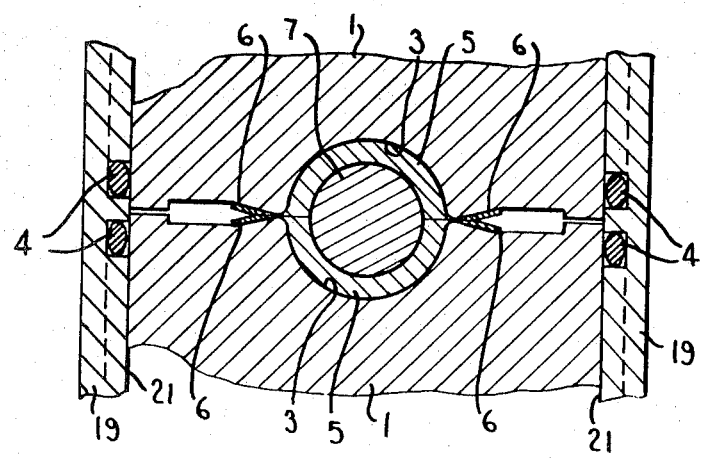
FIG. 2 is a diagrammatic cross section taken along line 2—2 of FIG. 1.

Referring now more particularly to the drawings, there is shown at numeral 1 a pair of rolls of a rolling mill designed in the usual way to draw lengths of metal between them and to exert squeezing and section reducing pressure. As shown in FIG. 2, the rolls contain peripheral grooves 3 which are substantially semicircular in cross section and adapted to receive in the bite 2 between them flat strips 5 on opposite sides of an aluminum wire core 7. The dimensions of the core and strips are such that the grooves of the rolls transversely bend the strips around the core and reduce the total cross section of the assembly under pressure such as will bring about solid-phase bonding between the copper and the aluminum, provided they are sufficiently clean. By this is meant that their contacting surface must not only have gross contaminants removed but also bond-deterrent films such as oxides and the like.

At numeral 9 is shown a drawing die providing back tension in response to the drawing action of the rolls 1. This die may also straighten and size the wire 7. Four idler rolls 11, three of which are shown, guide the wire core 7 from the die 9 to the nip 2 between rolls 1.

Figure 1:
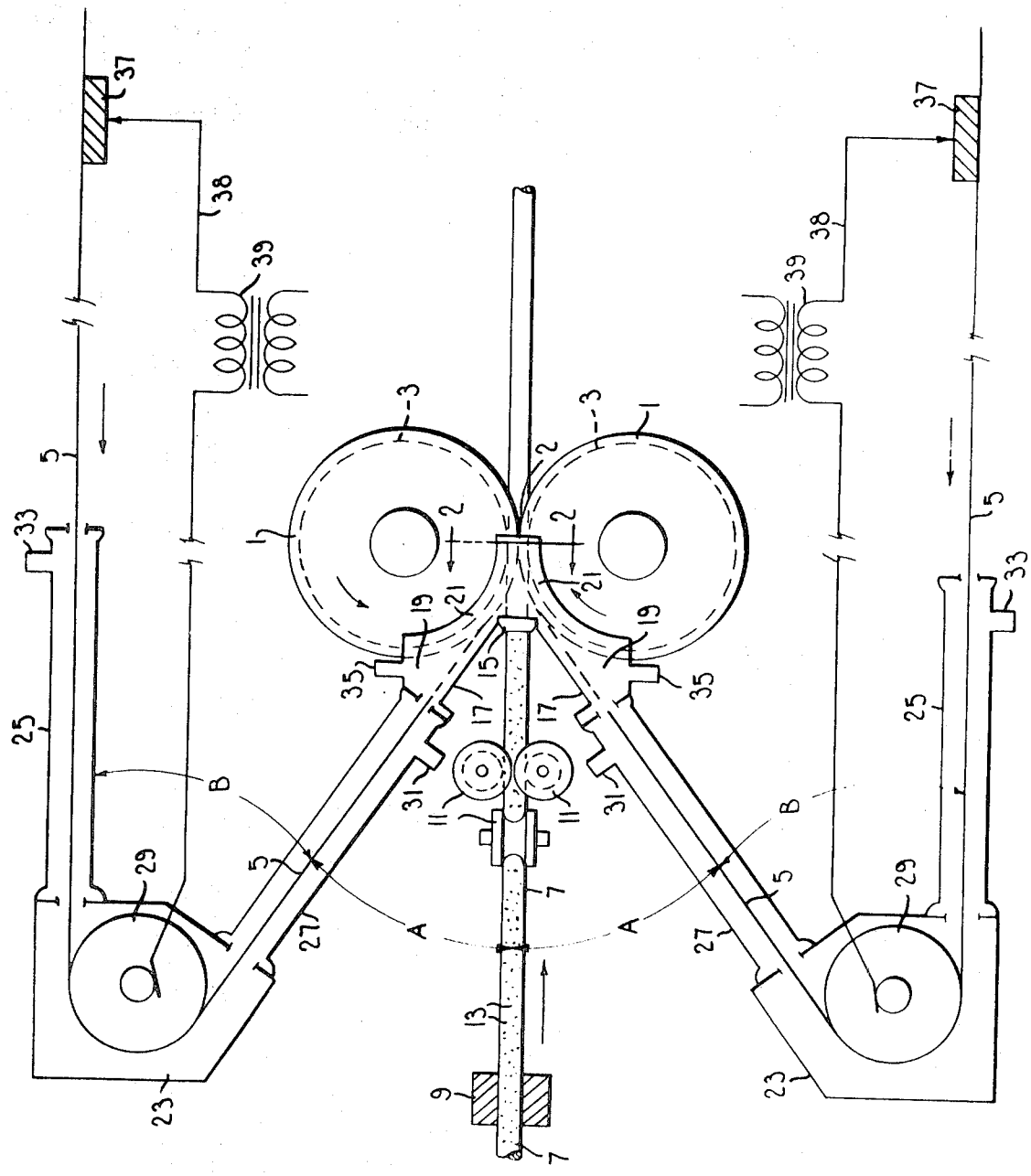

In FIG. 1 the stipling indicated by the numeral 13 represents the usual highly stable adherent oxide film which rapidly forms on virgin aluminum. In order to remove this oxide film 13 there is placed as closely as possible to the rolls 1 an annular inlet skiving or shaving die or other metal removing device 15 designed to skive or otherwise remove the oxide from the core. The structure hereinafter described makes this close placement possible. The die 15 is mounted upon and in the angular recess provided by an angled or forked framework 17. The framework 17 forms two gas manifolds 19 having sealing flanges 21 engaging marginal portions of the rolls 1 in advance of the bits 2. Packing 4 is employed between the flanges 21 and the rolls 1. Numerals 23 indicate gas manifolds each of which has an inlet portion 25 and a back-angled portion 27. Each portion 27 connects with one of the gas manifolds 19. In each manifold 23 is mounted an idling guide roll 29. Each roll 29 receives one of the strips 5 through its inlet portion 25 and guides it from manifold 25 to manifold 27 for subsequent passage to the nip 2 through connected manifold 19. Each set of manifolds 19, 27, 23 and 25 is internally connected.

Each manifold portion 27 includes an inlet 31 for the introduction of a reducing gas such as hydrogen for flow upwardly through the manifolds 27, 23 and 25, then through an outlet provided at 33. Each manifold 19 includes a gas inlet 35 into which, if desired, an inert atmosphere such as helium may be introduced. In the absence of such an inert atmosphere, manifolds 19 may receive reducing atmosphere from a manifold 27.

At numerals 37 are shown electrical brush contacts for the strips 5. Contacts 37 are in independent circuits 38 containing controlled power sources 39. The circuits connect with rolls 29. Thus the reaches of the strip 5 between the brush contacts 37 and the rolls 29 close the circuit, thus providing for heating of said reaches.

Rolls 29 and 1 could also be connected to other taps in the power supply in such a manner that heat is provided between contacts 37 and rolls 29 and 1 to maintain or increase the temperature between these rolls.

In this regard, reference may be had to U.S. Pat. No. 3,095,500 in which is disclosed similar heating methods.

Figure 3:
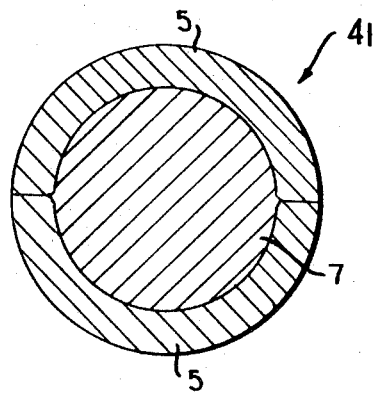
FIG. 3 is a cross section of a finished product.

Typical operation is as follows:

The copper strips 5 are cleaned by pickling, wire brushing or the like to remove gross and other contaminants, including oxide. Rotation of the rolls 1 in the direction shown by the darts draws into the nip 2 the copper strips 5 and the core 7. The strips pass in heated condition through air between contacts 37 and manifolds 25 where reduced oil and other contaminants are oxidized and burned off. The strips 5 then pass through the gas manifolds 25, 23, 27 and 19, respectively, when the oxides are chemically reduced. The heating which may for example be at 1,600° F. drives off molecular films not theretofore removed. The core 7 may be at room temperature or as much as 300° F. or so. The heating is also useful for controlling the physical characteristics of the strips 5 preparatory to bonding. Some cooling may occur in the manifolds 27 and 19 unless provision is made for additional power input as described above. The rolls 1 squeeze the copper strips 5 around the skived aluminum wire core 7 as the core is pulled through the back-tensioning drawing die 9 and the circular skiver 15. Thus oxide-free virgin copper and aluminum surfaces are squeezed together by reduction of the composite cross section with a resulting solid-phase bond between all parts 7 and 5. The resulting marginal waste 6 is in some cases squeezed off and falls away, and, if not, it may readily be removed by suitable bending or skiving. The form of the finished product is shown at 41 in FIG. 3. It may be subsequently heated to improve the bonds by sintering action.

Aluminum or copper oxide reformation does not occur in manifolds 19 because of the existence of reducing or inert gas therein. It will be understood that if inert gas is not introduced into the manifold 19, the hydrogen will flow into them from the manifold 27. It will also be seen that since the skiver 15 is close to the nip 2, the time interval of core travel therebetween is short.

The annular skiver 15 removes all aluminum oxide and other contaminants, leaving a virgin aluminum surface against which the cleaned surfaces of the strips are brought at the nip space.

A feature of the invention is that the electrical heating of the strips 5 may be terminated at substantial distance from the nip 2. Thus there is provided a dwell time during which the strips may cool somewhat or be maintained at a constant temperature before entering the nip. This permits the strip being taken to temperatures for facilitating copper oxide removal by heating without having the strip unduly hot upon entering the nip. It may be remarked that heretofore when electrical heating was used, the connection with the strip instead of being made at some distance ahead of the nip was made at the nip by closing the circuit through rolls such as 1. This did not admit of any dwell time.

It will be noted that it is the outside of each copper strip 5 which requires cleaning and it is the other side of the strip that contacts its roll 29. Thus the bonding surfaces of strip 5 are on the outsides of idler rolls 29 and remain clean and uncontaminated all the way through the pass line to the nip 2.

Another advantage of the invention exists by reason of the large angles A indicated on FIG. 1. This provides considerable space close to the nip 2 in which the skiving ring 15 may be located on and between the manifolds 19. Since the skiving ring 15 forms an inlet to both manifolds 19, the skived core is not subject to substantial oxide reformation before it reaches the nip 2. Moreover, even if a protective atmosphere is not used in the manifolds 19, the fact that the large angles A permit the skiver 15 to be brought close to nip 2 results in a very short distance that the virgin aluminum core needs to travel between skiving and bonding. Thus if the rolls 1 are, for example, 7 inches in diameter, a minimum practical distance is about 3 inches. At a normal product speed of 50 feet a minute, the elapsed time between skiving and bonding is on the order of 0.30 seconds, which is short enough to prevent the substantial reformation of aluminum oxide on the virgin aluminum even in air which might leak into the manifolds 9.

In view of the above, it will be seen that the several objects of the invention are achieved and other advantageous results attained.

As various changes could be made in the above products, constructions and methods without departing from the scope of the invention, it is intended that all matter contained in the above description or shown in the accompanying drawings shall be interpreted as illustrative and not in a limiting sense.

What is claimed is:

1. Apparatus for cladding a round metallic, aluminum core with metal comprising means directing a length of round metallic, aluminum core material along a selected path, means cutting metal material from the entire periphery of said length of round aluminum core material to expose a virgin metal surface therearound which is substantially free of bond-deterrent materials, means maintaining said virgin metal surface of said aluminum core material free of bond-deterrent materials, means directing clean metal cladding material around said virgin metal surface, and means pressing said cladding material against said virgin metal core surface entirely around the periphery of said core material with reduction in the composite thickness of said core and cladding materials for solid-phase bonding said core and cladding materials together entirely around said core periphery.

2. Apparatus for cladding a round metallic aluminum core with metal comprising annular skiving means, means directing a length of round metallic, aluminum core material through said annular skiving means for cutting metal material from the entire periphery of said length of round aluminum core material to expose a virgin metal surface therearound which is substantially free of bond-deterrent materials, means establishing a protective atmosphere around said virgin metal surface for preventing oxide-film formation on said virgin metal surface, means directing clean metal cladding material around said virgin metal surface, and means pressing said cladding material against said virgin metal core surface entirely around the periphery of said core material with reduction in the composite thickness of said core and cladding materials for solid-phase bonding said core and cladding materials together entirely around said core periphery.

3. Apparatus for cladding a round metallic core with metal comprising peripherally grooved drawing and squeezing rolls forming a nip space therebetween, annular skiving means mounted adjacent to said nip space, means directing a length of round metallic core material to be drawn into said nip space through said annular skiving means by said rolls for cutting metal from the entire periphery of said length of core material to expose a virgin metal surface therearound which is substantially free of bond-deterrent films, means establishing a protective atmosphere around said core material between said skiving means and nip space to prevent any substantial oxide-film formation on said virgin metal surface, and means directing lengths of clean metal cladding material to be drawn into said nip space around said virgin metal surface by said rolls to be squeezed with said core material between said rolls for solid-phase bonding said core and cladding materials together.

4. Apparatus as set forth in claim 3 wherein said atmosphere-establishing means comprises manifold means mounted between said skiving means and nip space, and means providing a protective atmosphere within said manifold means, said manifold means having an inlet for said core material, said skiving means being mounted in said inlet for sealing said inlet around said core material.

5. Apparatus as set forth in claim 4 wherein said manifold means is disposed in sealing relation to said rolls.

6. Apparatus for cladding a round aluminum core material with a copper material comprising peripherally grooved drawing and squeezing rolls forming a nip space therebetween, annular skiving means mounted adjacent to said nip space, means directing a length of round aluminum core material to be drawn into said nip space through said annular skiving means by said rolls for cutting metal material from the entire periphery of said length of core material to expose a virgin metal surface therearound which is substantially free of aluminum oxide material, means directing lengths of copper cladding material to be drawn into said nip space around said virgin metal surface by said rolls from opposite sides of said core material along paths which are at least partly angled with respect to said core material, means establishing a protective atmosphere around said core material between said skiving means and nip space to prevent any substantial reformation of aluminum oxide film on said virgin metal surface and establishing an oxide-reducing atmosphere around said lengths of cladding material in said paths, and means heating said lengths of cladding material for removing oxide films from said lengths of cladding material in said oxide-reducing atmosphere, said rolls squeezing said core and cladding materials together with reduction in a composite thickness thereof for solid-phase bonding said core and cladding materials together.

7. Apparatus according to claim 6 wherein said means establishing said protective and oxide-reducing atmospheres comprises manifold means having inlets for receiving said core material and said lengths of cladding material, and means providing an oxide-reducing atmosphere in said manifold means around said lengths of cladding material and said virgin metal surface of said core material, said manifold means being disposed in sealing relation to said rolls, said annular skiving means being disposed in said core material inlet for sealing said inlet around said core material.

8. Apparatus as set forth in claim 7 wherein said means directing said lengths of cladding material include idling-roll means guiding said lengths of cladding material over paths which include doubled-back path portions, and said manifold means enclose said doubled-back path portions.

9. Apparatus as set forth in claim 7 wherein said heating means heat said lengths of cladding material at least partly outside said manifold means.

10. Apparatus as set forth in claim 6 wherein said means directing said lengths of cladding material include idling-roll means engaging said lengths in spaced relation to said nip space, and said heating means direct electrical current through portions of said lengths of cladding material which are spaced from said nip space and which terminate at said idling-roll means.

11. Apparatus as set forth in claim 6 wherein said grooved squeezing rolls form a substantially circular nip space therebetween.